Sept. 27, 1966 M. GOROSZKO 3,275,861
ELECTRIC MOTOR WITH ARCUATE POLE PIECES
Filed Feb. 5, 1965 4 Sheets-Sheet 2
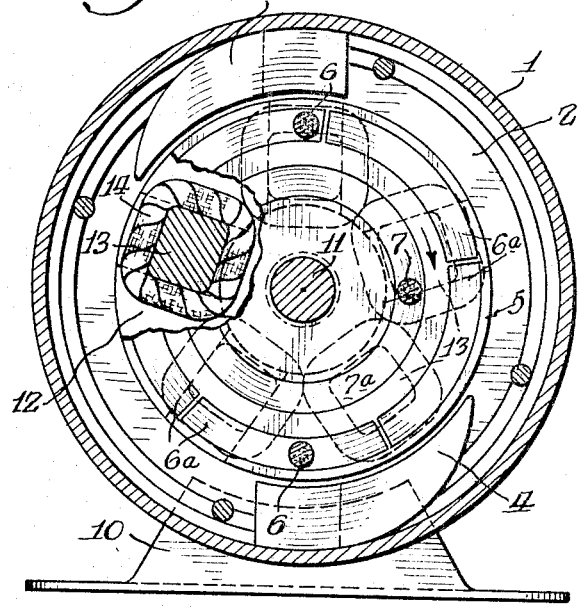
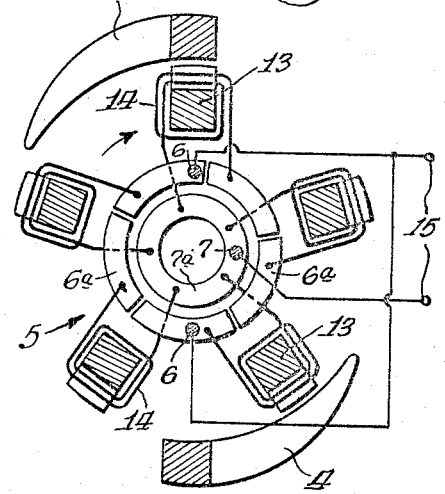
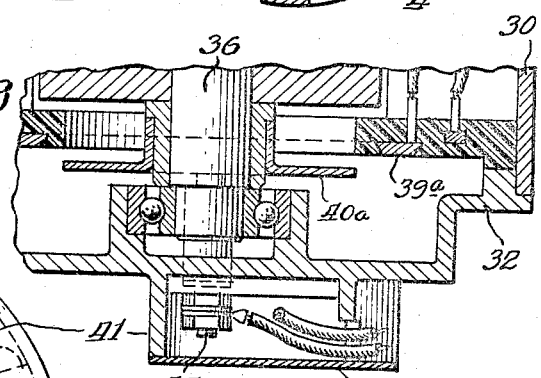
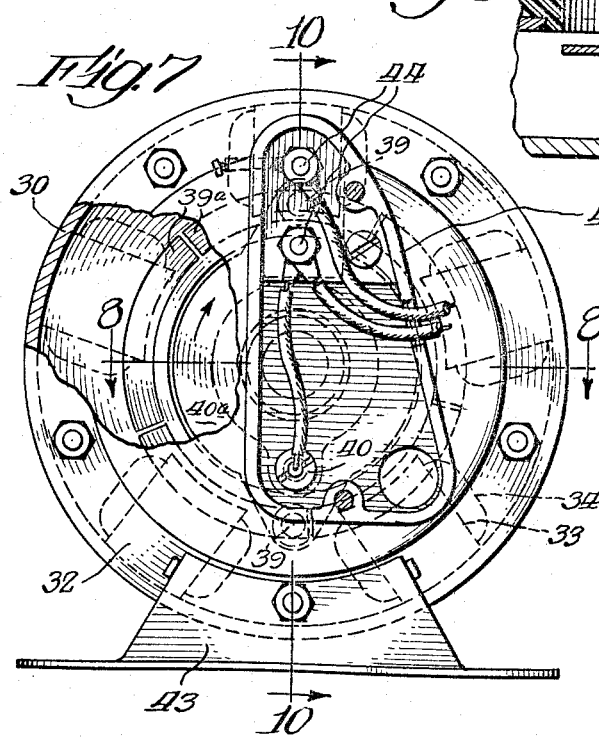
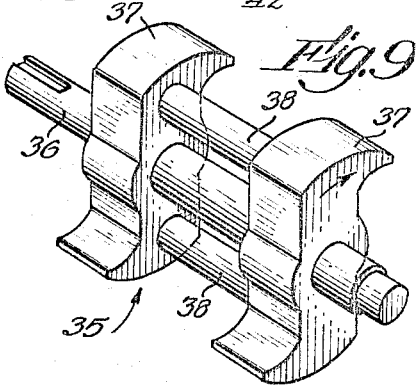
Inventor:
Max Goroszko Inventor:
Max Goroszko

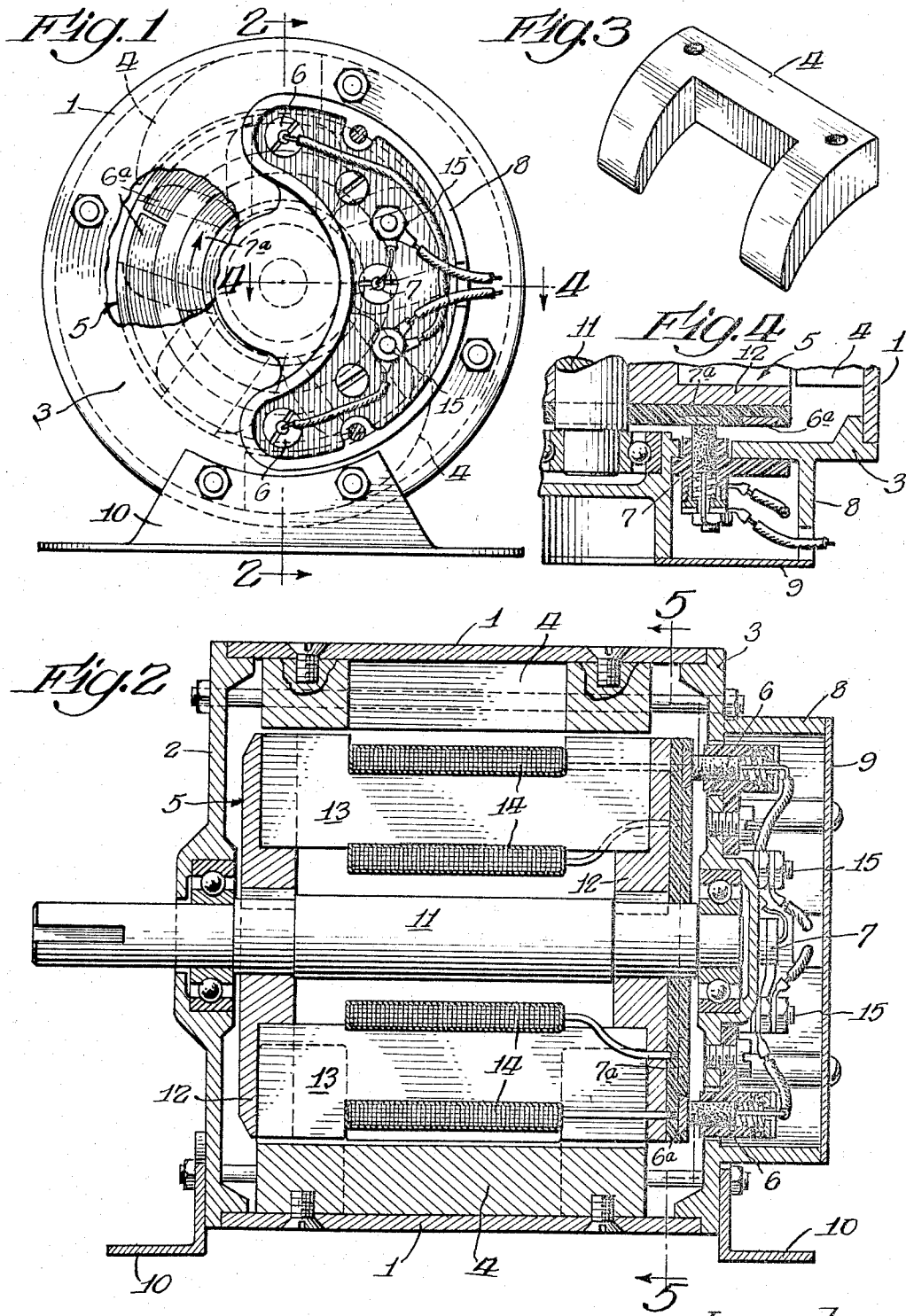

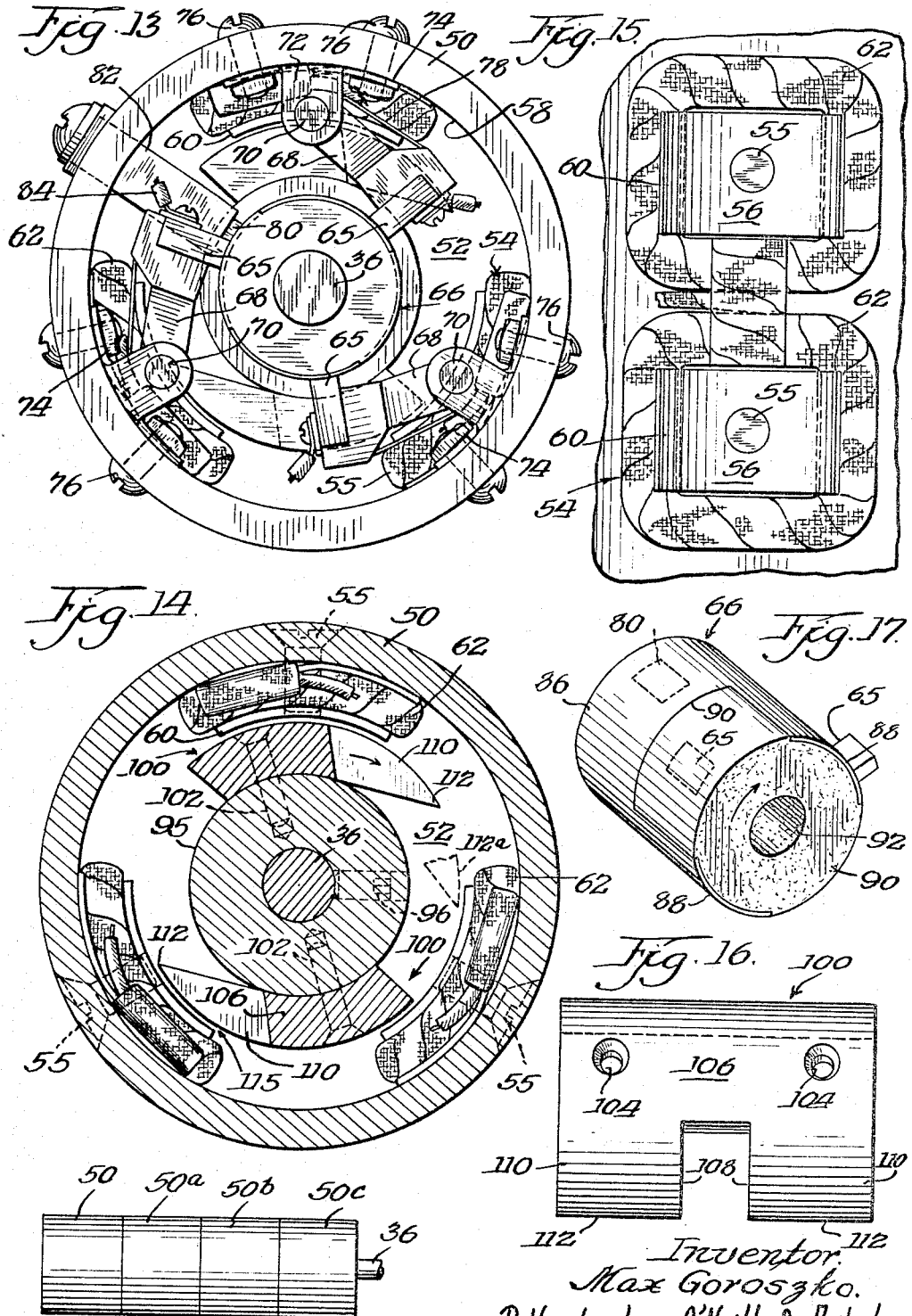

United States Patent Office 3,275,861
Patented Sept. 27, 1966

1

3,275,861
ELECTRIC MOTOR WITH ARCUATE POLE PIECES
Max Goroszko, 2443 W. Armitage Ave., Chicago 47, Ill.
Filed Feb. 5, 1965, Ser. No. 432,075
4 Claims. (Cl. 310—46)

This application is a continuation-in-part application of my co-pending application Serial No. 82,354, now abandoned, entitled Electric Motors or Machines, filed on January 12, 1961.

The present invention relates to an improved electric motor or machine and more particularly to an electric motor having a novel construction wherein an electromagnetic attraction is provided to effect the driving force.

Accordingly, a principal object of the present invention is to provide a novel electric motor wherein only electromagnetic attraction is utilized to effect a driving force or torque and electromagnetic repulsion is not relied upon as a driving force.

Another object is to provide a means for obtaining additional leverage for a torque in an electric motor without the use of gears or other mechanical means.

Another object is to construct a direct current motor with minimum of hysteresis and overheating due to molecular friction in the magnetic cores caused by the frequent change in their polarity.

Another object is to provide a means for construction of novel forms and designs of electric machines.

A further object is to provide, in a rotary magnetic machine, flux leading extensions adjacent an increasing cross-section and a shortening flux path in iron.

A still further object is to provide a rotary magnetic machine in keeping with the preceding objects having a minimum number of poles.

Anohter object in keeping with the next preceding object is to provide a unit having a variable number of stator poles and two rotor poles.

Another object in keeping with the next preceding object is to provide direct current selectivity to the stator poles.

With the above general objects in view, and others that will appear as the invention is better understood, the same being and consisting of the novel construction, combination and arrangement of parts hereinafter more fully described, illustrated in the accompanying drawings, and pointed out in the appended claims.

In the drawings, illustrating three forms of my invention and forming a part of this application, like designating characters refer to corresponding parts throughout the several views.

FIGS. 1 to 6 illustrate one form of the invention; FIGS. 7 to 12 illustrate another form of the same; and FIGS. 13 to 17 illustrate a presently preferred form of the invention.

FIG. 1 is an end view with parts broken away and connection plate removed;

FIG. 2 is an enlarged vertical cross section substantially on line 2—2;

FIG. 3 is a perspective view of one of the stator members;

FIG. 4 is a fragmentary section showing the slip-ring brush and taken on line 4—4 of FIG. 1;

FIG. 5 is a vertical sectional view on a reduced scale taken on line 5—5 of FIG. 2;

FIG. 6 is a wiring diagram;

FIG. 7 is an elevation view with parts broken away;

FIG. 8 is an enlarged fragmentary sectional view taken on line 8—8 of FIG. 7;

FIG. 9 is a perspective view of the rotor;

FIG. 10 is an enlarged vertical section taken on line 10—10 of FIG. 7;

FIG. 11 is a reduced vertical sectional view taken on line 11—11 of FIG. 10;

2

Figure 12:
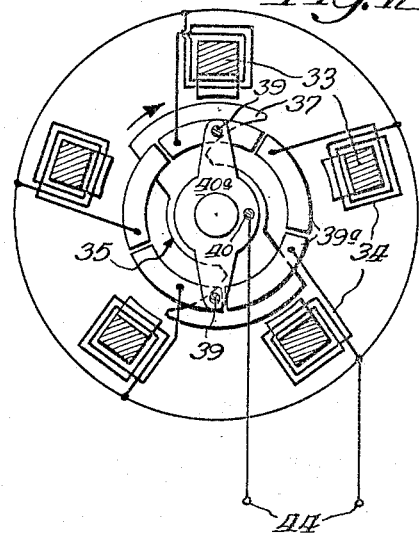

FIG. 12 is a wiring diagram of the motor shown in FIGS. 7 to 11 inclusive;

FIG. 13 is an elevational view with an end bearing plate removed;

FIG. 14 is a sectional view taken diametrically through the rotor;

FIG. 15 is a face view of an electromagnetic pole;

FIG. 16 is an end view of a ferromagnetic armature;

FIG. 17 is a perspective view of a commutator shown in end view in FIG. 13.

FIG. 18 is a diagrammatic view of a multiple unit assembly of this invention.

Referring first to FIGS. 1 and 2, the motor has a casing consisting of a cylindrical shell 1, and two end plates 2 and 3, mounted on the base plates 10. The stator members 4 are carried on the inner periphery of the cylindrical shell 1 of the motor casing and consists of two co-axially curved portions of magnetic material, slotted at mid-section of one of their longitudinal sides, the resulting end projections (or horns) are then tapered to the point, as illustrated in FIG. 3.

The five rotor members 5, consisting of core 13 and windings 14 (see also FIG. 6), are individual U-shaped bi-polar units mounted in co-axial relation to the shaft 11 by means of two non-magnetic side plates 12. They are wound and electrically energized so that all like poles are at one end of the motor and the opposite poles at the other end of same.

The commutators in this illustration of my motor are disc-type and are insulated and mounted on the front rotor plate 3. Commutator 6A is split into five equal segments (see FIG. 6), each segment being connected to the nearest pole winding of the rotor. Commutator or slip-ring 7A is a solid ring-type and is connected to all of the opposite pole windings of the rotor. It is to be understood that other types of commutators may be used by those known in the art.

The brush holders with brushes 6 are insulated and mounted in terminal box 8, in opposite relation to each other and so that they contact the commutator, thereby providing a means for electric current to be connected to its segments. A third brush holder with brush 7 is similarly mounted at any point where it may contact slip-ring 7A, thereby completing the electric circuit.

During the operation of the motor, two opposite members of the rotor assembly are always energized, but because of their uneven number, they are always at half-point with respect to their relative position with the stator members; this condition produces a strong and well-balanced torque throughout the complete revolution and also at start of the motor.

The horns of the stator cause the direction of revolution; if a reversible motor is desired, they may be constructed on both sides of the main stem; in this case, the direction of rotation is controlled by adjusting the brushes 6 for the desired result. Moreover, the horns may be constructed on either or both sides of the main stem of the rotor and/or of the stator.

Another form of my invention is illustrated in FIGS. 7 to 12. This form is, in effect, an opposite construction to the one above described and consists of a wound stator and an unwound rotor.

Figure 10:
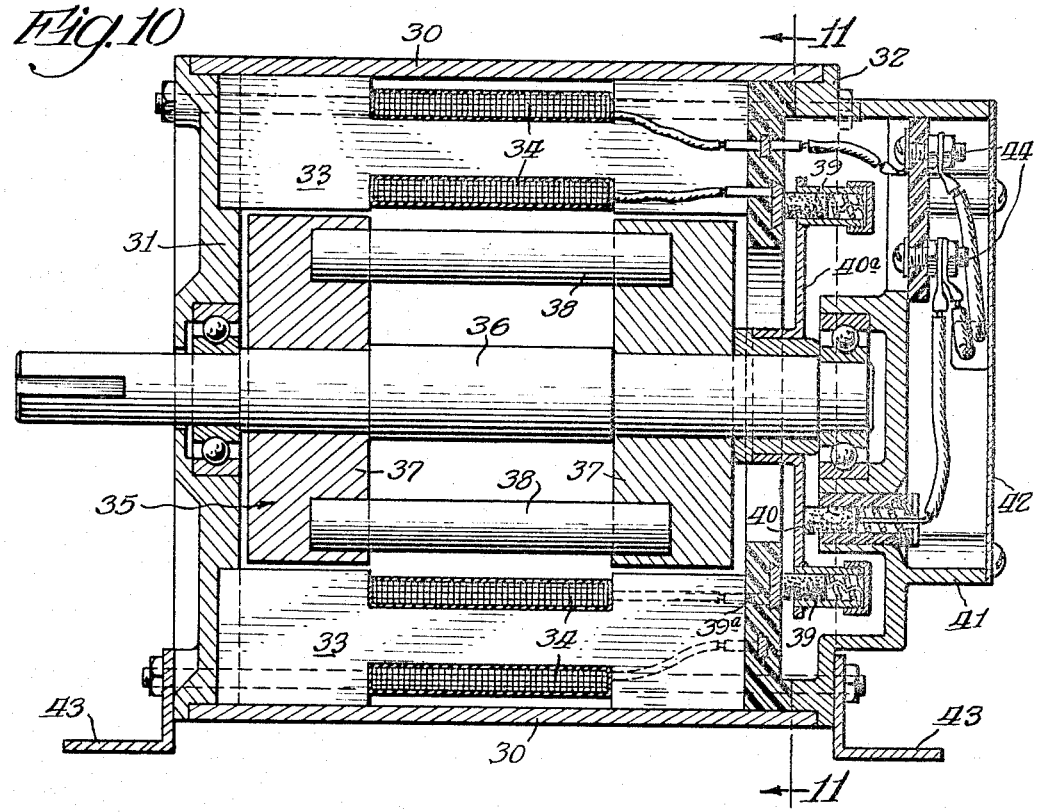
Figure 11:
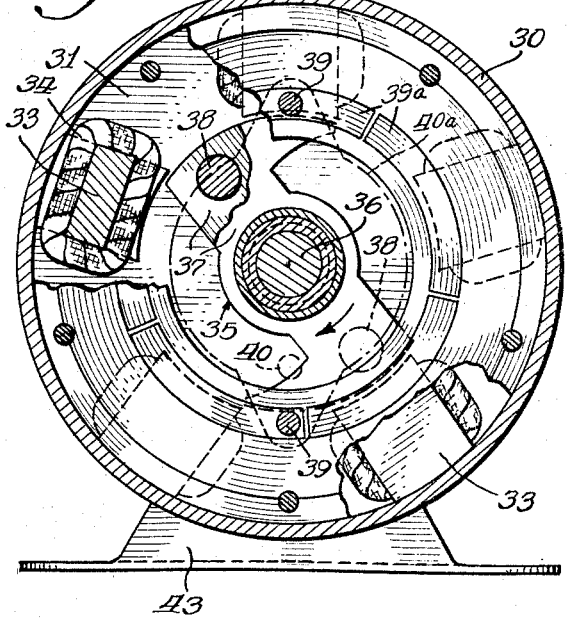

This form of my invention has a non-magnetic shell 30 supported by two end plate assemblies 31 and 32 of non-magnetic material and attached to base plates 43 (see FIG. 10). The five wound stator members or units 33 (see also FIG. 12), are made of either solid or laminated magnetic materials. The stator units 33 are held in co-axial relation with the shaft 36 by resting the stator units 33 on the inner recesses of the end plate assemblies, and are circumferentially spaced by means of notches in the respective plate assemblies. The stator units 33 are electrically energized by respective windings 34.

The rotor assembly, illustrated in FIG. 9, consists of members 35–37, constructed of magnetic material, mounted on shaft 36 and connected by flux bars 38 for a shorter flux complement with the poles of the stator.

A disc commutator 39A (see FIG. 12), consisting of five equally spaced segments and each being connected to the nearest pole of the wound stator members 33, is insulated and mounted on the front end plate assembly. Two brushes 39 are insulated and mounted on shaft 36 so as to contact the five commutator segments 39A at the opposite sides of same. A slip-ring commutator 40A is insulated and mounted on the front end of the shaft 36 (see FIG. 10), and the slip-ring brush 40 is installed through the insulated brush holder so as to contact the said slip-ring. The brush assembly is mounted within the terminal box 41 with cover 42. The electric current connections are made by means of terminals 44, detailed in wiring diagram (FIG. 12).

During the operation of the motor, two of the five stator units are intermittently energized, but because of the uneven number of the stator units, they are always at halfpoint with respect to their relative position with the rotor members; this condition produces a strong and well-balanced torque throughout the complete revolution of the rotor and also during the starting of the motor.

In the above-described two forms of my invention, the number of poles may be varied; any number of poles, both odd or even, may be satisfactorily utilized, according to the desired specific need. Also, in the second form of my invention, an even number of wound stator members may be used. In this case, a cross magnetic flux may be employed by eliminating the parallel flux bars of the rotor and changing one-half of the wound stator members to opposite polarity.

FIGS. 13 to 17 show another, and presently preferred, embodiment of my invention.

Referring to this latter embodiment, a frame 50, formed of a suitable metal and preferably a metal having low remanence characteristics, comprises the main support member for the motor and the ends of the frame 50 are closed by a pair of bearing plates 52, only one of which is illustrated in FIGS. 13 and 14. Each of the bearing plates 52 may be substantially identical to the bearing plate 31 in FIG. 10. A drive shaft 36 is supported on suitable bearings in the bearing plates 52.

The frame 50 supports three similar electromagnet field providing units 54 in angularly, peripheral or circumferential spaced relation as will be explained. Each unit 54 includes an iron core 56 which is secured by suitable machine screw 55 to the interior surface 58 of the frame 50 to provide a good magnetic flux path through the cores 56 and the frame 50. Each core 56 has an extended pole face 60 which also serves to secure the respective winding 62 in position. As best shown, in FIG. 13 or 14, a first set of three electromagnetic units 54 is mounted in peripheral or circumferential spaced relation. The units 54 in one set are mounted in axial alignment with the units 54 in the other set. See FIG. 15. In other words, pairs of electromagnetic units are mounted in axially spaced relation.

The windings 62 wound on each pair of electromagnetic units are wound to effect respective north and south polarities to the pole faces 60 of the two axially spaced cores in the pair of magnetic units 54. For example, in FIG. 15, the lower unit 54 is, say, of a south polarity and the upper unit is of a north polarity. Also, all the units 54 in one set are of the same polarity, i.e., all the units indicated in FIG. 13 are of one, say north, polarity, and all the units shown in FIG. 14 are of the same, say south, polarity.

The windings 62 are selectively energized through a commutator 66 from a source of D.C. power such as an automobile battery, not shown. The three energizing brushes 65 cooperate with a commutator 66 in the conventional manner. Each brush 65 is carried by suitable securing means on an arm 65 pivoted on a pivot 70. Pivot 70 is in turn mounted in ears 72 of a bracket 74 which is suitably secured by bolts 76 to the frame 50. The brushes 65 are biased downward in conventional manner by a leaf spring 78 suitably secured to the brackets 74. A terminal 84 connects to the windings 62.

A brush 80 in a suitable insulating sleeve 82 is connected to the source of power. Brush 80 electrically couples to the commutator as graphically indicated by the dotted square in FIG. 17.

The commutator 66 which is of suitable dielectric core material 90a has an axial hole 92 for rotatable mounting the commutator on the shaft 36. The surface of commutator 66 includes copper or other suitable electrical conductive material. The conductive material extends 360° around the rotor at the left-hand end 86, as oriented in FIG. 17. On the right-hand end of commutator 66, the conductive material extends circumferentially a distance of about 90° in each of two spaced sections 88, and the sections 88 are also spaced apart a distance of about 90°. The conductive material on the commutator 66 energizes the brushes 65, as is shown in the art.

The commutator 66 operates in the same manner as the commutators described hereinabove.

FIGS. 14 and 17 show respectively the assembly and details of construction of electromagnetic units 54 showing the relation of the pole faces 60 and the armature or rotor members 100.

The armature or rotor members 100 which are generally similar in shape to the above-described stator members 4 are secured to the sleeve 95 as by a plurality of machine screws 102 which pass through holes 104 in the base 106 of the stator member 4. The sleeve 95 can be of any suitable metal and may be secured to the shaft 36 as a set screw 96.

The front portion of the rotor member 100 is slotted 108 to form a pair of tapered extensions 110 extending in the direction of rotation of the rotor members 100, see FIG. 16. As best shown in FIG. 14, the extensions 110 extend to relatively sharp distal ends 112. The cylindrically shaped outer surfaces of the rotor members 100 are arranged to pass in close proximity to the pole pieces 60 with only a few thousandths of an inch clearance.

Each rotor member 100 is dimensioned, and positioned, so that it is affected, i.e., energized, by both magnetic units 54 of an axial pair. More specifically, say the left-hand side, as oriented in FIG. 16, of each rotor member 100, is affected by the flux lines of the lower magnetic unit 54 as shown in FIG. 15; while the right-hand side of the rotor member 100 is affected by the flux lines of the upper magnetic unit as shown in FIG. 15.

Note, that the left-hand side of a rotor member 100 is being affected and attracted by the flux lines from a pole face 60 which is at one polarity. At the same time, the right-hand side of the rotor member 100 is being affected and attracted by the flux lines from the companion axially spaced pole face 60 which is energized to be of the other polarity. The flux lines through the rotor member thus go from one (first) pole face 60, transversely across the air gap, through one side and the end 112 of the rotor member 100, axial across the rotor member 100, then transversely across the air gap to the other pole face 60, and through the machine frame 50 to the said first pole face.

Since the frame 50 does not necessarily provide part of the flux paths, the frame 50 can be of a non-magnetic or non-conductive material. Also, the frame 50 can be an open frame, that is, a frame formed of spaced ribs, which would tend to make the motor lighter in weight as well as enabling the motor to run at a relatively cool temperature.

Note, that each of the windings 62 are energized by current flowing in the relative same direction such that the respective pole faces 60 do not undergo a polarity change, but rather are always energized to be of the same polarity. The foregoing reduces hysteresis effects to a minimum and thereby allows the pole members, whether the stator or the rotor, to be constructed of solid material. Also, the reduction in hysteresis effect contributes toward permitting the motor to run at a relatively cool temperature.

The shape of the rotor member 100 is such that there is the very low reluctance of the thick base portion 106 of the rotor member 100. The reluctance of the rotor member 100 increases from the low reluctance at base 106 to a higher reluctance at the tapered extensions 110, and to a maximum reluctance at the ends 112 of rotor member 100.

In operation, as the armature or rotor member 100 rotates in the direction of the arrow, the ends 112 forming the leading edges of the rotor member 100, approach close proximity to the extended pole face 60, and flux lines provide an attraction between the pole face 60 and the rotor member 100, and hence initiate a pulling torque thereon.

As the shaft 36 rotates approximately another 20°, and, as the top rotor member 100, as oriented on FIG. 14, moves the 20°, a minimum reluctance path will obtain in the top rotor member. At this time the upper right-hand brush FIG. 17, will leave the respective conductive section 88 and de-energize the upper winding 62 and hence pole face 60. De-energization of the winding 62 will cause rotor member 100 to be de-energized and the rotor member 100 will move clockwise relatively uninhibited by any magnetic hysteresis from the upper pole face 60 and upper winding 62.

To attain maximum efficiency in this regard, that is to reduce the hysteresis effect, it is preferred that magnetic parts be fabricated preferably of low silicon iron, or other suitable alloys which have a low remanence, i.e., they do not retain their magnetism.

Note, that when the upper rotor member 100, FIG. 14, rotates approximately another 30 degrees, the end 112 will attain position 112a. At the position 112a, the commutator 66 is arranged to energize the succeeding winding 62 at the lower right side, FIG. 14, to provide an attractive torque to rotor member 100 as described above.

My motor operates on the principal of electromagnetic attraction only; no repulsion effect is involved.

Note, that at this point the pair of windings 62 (oriented at the top of FIG. 14) are de-energized. Thus, the various pairs of windings 62 are energized successively. The successive or intermittent utilization of all the windings 62 (and the associated cores) tends to make the motor run relatively cooler. The foregoing also permits the motor to drive a larger overload when necessary, such as when the motor is used as a starter for an automobile.

The modification thus described may be modified to provide any desired member of circumferentially spaced pairs of magnetic units 54; the overall operation of the motor remains the same. By utilizing the motor of my invention, it is possible to construct a motor of any diameter size, thus resulting in a greater torque and power force to suit any desired need. The foregoing is accomplished by using rotor members 100, windings 62 and cores 56 which have the same dimensions and relative proportion. In this modification two rotor members 100 are used and additional winding pairs 62 and the associated cores are arranged in spaced peripheral or circumferential relation on the frame 50. The radial distance of each of the two rotor members 100 is adjusted so that the members 100 pass adjacent the pole faces 60 with about the same air gap. This can be done by adjusting the length of the radial member, say screw 102, connecting the rotor members 100 to member 95. As mentioned above, this provides a means of obtaining additional leverage for a given torque in an electric motor without the use of gearing or other mechanical means.

Also, by connecting several motors 50, 50a, 50b and 50c, on the same shaft as indicated in FIG. 18, an overall motor having additional horsepower may be obtained.

While there is described herein a preferred embodiment, and two modifications, of the present invention, it is, nevertheless, to be understood that minor changes may be made therein without departing from the spirit and the scope of the invention as claimed.

I claim:
1. An electric motor rotatable about an axis of rotation and operating on the principle of magnetic attraction only, comprising in combination:
 (a) a plurality of energizable stator means each comprising a pair of magnetic units, each unit having a core and an energizing winding for said core, means connecting the cores of each of said pairs with each other to form a flux path between said cores, the units of a pair being mounted in said motor in spaced relation in an axial direction, each unit of a pair providing a same given polarity each time it is energized and the units of a pair providing poles of complementary polarities when energized;
 (b) a plurality of said stator means mounted in spaced circumferential relation, said stator means being uneven in number;
 (c) a rotor comprising a pair of members arranged in spaced radial relation, said members being arcuate such that the reluctance thereof decreases in the direction of rotation, said rotor members being positioned and dimensioned to have a path of rotation adjacent to said stators;
 (d) means mounting said rotor members for movement in a given direction relative to said stator means, and said rotor members being mounted closer to said axis than said stator;
 (e) said rotor members being dimensioned and positioned in said motor to have one side thereof attracted by one of the magnetic units of a pair and the other side thereof concurrently attracted by the other one of the magnetic units of a pair; and
 (f) commutator means electrically connected to said magnetic units for selectively energizing and de-energizing said stator means in response to the relative position of said rotor members to said stator means to cause said stator means to magnetically attract said rotor members as said members move in a direction toward and adjacent said stator means and to terminate or cut-off said attraction when said rotor members move in a direction away from said stator means.

2. A motor as in claim 1, wherein each of said rotor members has a slot formed in the leading edge thereof whereby the flux path is directed through said rotor member for greater efficiency.

3. A motor as in claim 1 further including a cylindrical commutator having a conductive segment at one axial position on its periphery and spaced conductive segments at a second axial position on its periphery, and brush means mounted adjacent the periphery of said commutator to selectively contact said conductive segments.

4. An electric motor rotatable about an axis of rotation and operating on the principle of magnetic attraction only, comprising in combination:
 (a) a plurality of energizable rotor means each comprising an energizing winding and a core having two pole pieces, the pole pieces of a core being mounted in said motor to be in spaced relation in an axial direction, each pole piece of a core providing a same given polarity each time it is energized and the pole pieces of a core providing complementary polarities when energized;
 (b) a plurality of said rotor means mounted in spaced circumferential relation, said rotor means being uneven in number;
 (c) a stator comprising a pair of members arranged in spaced radial relation, said members being arcuate such that the reluctances thereof decreases in the direction of the rotation of said rotor;

(d) means mounting said rotor means being positioned and dimensioned to have a path of rotation adjacent to said stators, and said rotor means being mounted closer to said axis than said stator;

(e) said rotor means each being dimensioned and positioned in said motor to selectively provide an attractive force concurrently between both of the pole pieces of a core and said stator members;

(f) commutator means electrically connected to said rotor means for selectively energizing and de-energizing said rotor means in response to the relative position of said rotor means to said stator members to cause said rotor means to effect a magnetic attraction toward said stator members as said rotor means move in a direction toward and adjacent said stator member and to terminate or cut-off said attraction when said rotor means move in a direction away from said stator members.

References Cited by the Examiner

UNITED STATES PATENTS

| | | | |
|---|---|---|---|
| 1,835,721 | 12/1931 | Powell | 310—46 |
| 2,109,111 | 2/1938 | Gearhart | 310—46 |
| 2,232,061 | 2/1941 | Gillen | 310—46 |
| 2,235,151 | 3/1941 | Gillen | 310—46 |
| 2,334,153 | 11/1943 | Wilson | 310—46 |
| 2,469,834 | 5/1949 | Maerz | 310—46 |
| 2,648,786 | 8/1953 | Kritter | 310—46 |
| 2,831,154 | 4/1958 | Dudenhausen | 310—46 |
| 2,916,684 | 12/1959 | Schneider | 310—46 |
| 2,968,755 | 1/1961 | Baermann | 310—46 |

MAX L. LEVY, *Primary Examiner.*

MILTON O. HIRSHFIELD, ORIS L. RADER,
*Examiners.*

J. W. GIBBS, *Assistant Examiner.*